M. P. JANISCH.
VULCANIZER.
APPLICATION FILED DEC. 6, 1917.
1,280,230. Patented Oct. 1, 1918.
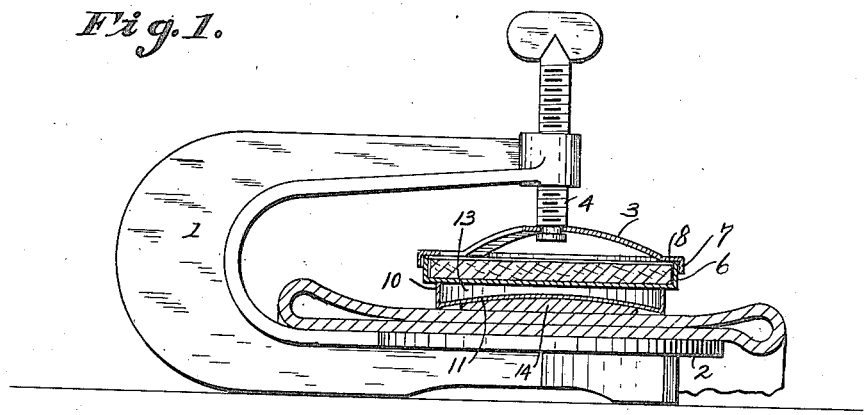
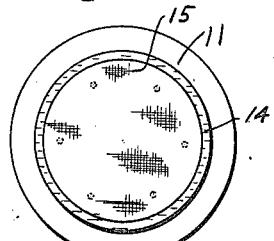
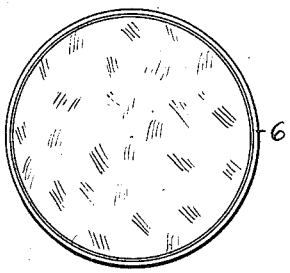
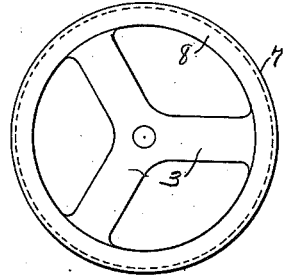
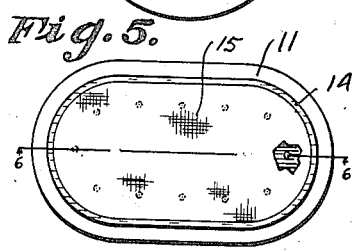
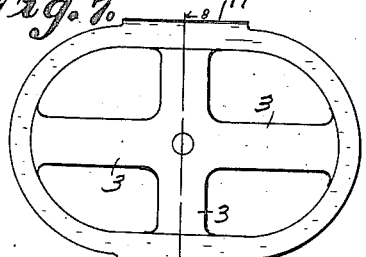
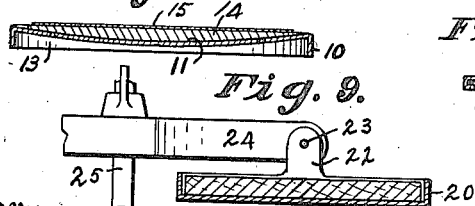
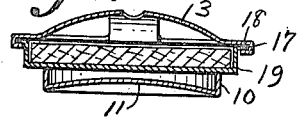

UNITED STATES PATENT OFFICE.

MAXIMILLIAN P. JANISCH, OF MILWAUKEE, WISCONSIN, ASSIGNOR TO DAVID W. JONES, OF WAUPUN, WISCONSIN.

VULCANIZER.

1,280,230.  Specification of Letters Patent.  Patented Oct. 1, 1918.

Application filed December 6, 1917. Serial No. 205,828.

*To all whom it may concern:*

Be it known that I, MAXIMILLIAN P. JANISCH, a citizen of the United States, residing at Milwaukee, county of Milwaukee, and State of Wisconsin, have invented new and useful Improvements in Vulcanizers, of which the following is a specification.

My invention relates to improvements in vulcanizers, and pertains especially to that class of vulcanizers in which semi-solid or solid composition fuels are employed.

Composition fuels, such for example as card board saturated with salt-peter and sugar, produce intense heat for short periods, and when properly prepared burn quickly without flame in substantially the same manner that a fuse burns. The heat developed is considerably above a proper vulcanizing temperature, it being undesirable that the temperature should rise above 300° Fahrenheit. But in vulcanizing patches for repairing the inner tubes of pneumatic tires it is possible to utilize a high temperature, provided such temperature is maintained for only a short period of time. Therefore, the common practice heretofore has been to place the fuel upon one of the clamping plates in direct contact with the patch and ignite the fuel after clamping the plate in position.

To facilitate repair work vulcanizing patches have been made in which a shallow pad of thin metal has been employed to contain the fuel, a repair patch being applied to the under surface of the pan ready for use, and the pan being thrown away after the vulcanizing operation has been completed. In such cases the quantity of fuel used in the pan is very small, and to avoid expense in the construction of pans and in the use of fuel extremely thin material is used with the result that quite frequently the means employed for clamping the pan in position breaks down the wall of the pan or bends it at one or more points, thereby relieving the clamping pressure to such an extent that an imperfect patch results.

The object of my invention is to provide means whereby a clamping member connected with suitable clamping mechanism may be utilized as a fuel container, and may be permanently connected with the clamping screw or other pressure applying mechanism, the patch being furnished in the form of a package comprising a patch supporting spacing member, through which the pressure is indirectly applied to the patch, the spacer receiving the direct pressure of the fuel container. In this manner I am enabled to use the spacer as a heat distributer, and also for the purpose of modifying the intense heat during combustion and maintaining the heat for a longer period after the fuel has been burned.

In the drawings:—

Figure 1 is a side elevation, partly in vertical section, showing my improved vulcanizer in position for use, the tire tube to be repaired being shown in cross section.

Fig. 2 is a view of the under surface of the patch supporting spacing member, showing the patch in position.

Fig. 3 is a plan view of one form of fuel container, embodying my invention, and which is adapted to be used repeatedly in connection with the same clamping mechanism, although not directly attached thereto.

Fig. 4 is a plan view of the clamping spider employed in connection with the fuel container pan illustrated in Fig. 3.

Fig. 5 is a bottom plan view showing a modified form of pan supporting member.

Fig. 6 is a cross sectional view of the same, drawn on line 6—6 of Fig. 5.

Fig. 7 is a plan view showing a modified form of clamping spider.

Fig. 8 is a cross sectional view, drawn on line 8—8 of Fig. 7, showing a removable fuel containing pan applied thereto.

Fig. 9 is a detail sectional view showing a modified form of clamping mechanism, and a fuel containing pan permanently secured to the pressure applying arm.

Like parts are identified by the same reference characters throughout the several views.

In Figure 1 the clamping mechanism comprises a U-shaped yoke 1 provided with a relatively fixed clamping plate 2 secured to the lower arm, and a clamping spider 3 swiveled to a set screw 4 having threaded bearing in the upper arm. A fuel containing pan 6 comprises an ordinary circular or oval receptacle adapted to be received within a down turned flange 7 connected with the clamping spider 3, said flange depending from a horizontal ring or flange 8, which, when the fuel containing pan is in position of use, laps over the margin of the fuel, preventing the fuel disk from warping and lifting at its margins during combustion.

It is very desirable that the fuel be prevented from lifting at its margins during combustion, for the reason that if air is allowed to pass under the fuel, combustion is greatly accelerated and the bottom of the pan is not properly heated.

It is not material whether the bottom of the pan is perforated or not, since the fuel will ordinarily be in the form of a disk and would have little or no tendency to drop through openings in the bottom of the pan during combustion.

The spacing member referred to in the introduction of the specification is preferably in the form of a shallow pan, having raised margins 10 and a concave bottom 11, thereby providing a shallow air space 13 between the bottom of the fuel pan and the bottom of the spacing number. The patch 14 is applied to the bottom of this spacing member, and the clamping pressure is applied thereto by means of the screw 4, through the spider 3, pan 6 and the spacing member. When the fuel is ignited the heat is distributed to the pan 14, across the air chamber 13 and downwardly through the upturned walls 10 of the spacer. The temperature will, therefore, not rise to as high a point in the patch as it would if the fuel were in direct contact with the bottom wall of the spacer, but it will be maintained for a longer period, not only because of the increased stock in the fuel containing pan and spacer taken together, but also by reason of the highly heated confined air within the spacer, and the fact that the fuel containing pan being repeatedly used can, without material increase of expense, be made of fairly heavy material. The spacer may be thrown away, or it may, if desired, be repeatedly used where patches are independently applied. Where patches are applied to the bottom walls of the spacer they are preferably covered with a piece of fabric indicated at 15 in Fig. 2, whereby the adhesive quality of the patch may be more effectually preserved.

In Figs. 7 and 8, I have provided a form of spider having at its sides channeled ways 17, adapted to receive outwardly turned flanges 18 carried by a fuel containing pan 19, the pan otherwise being substantially the same in structure as that shown in Fig. 1, except that the flanges 18 are preferably straight so as to slide properly in the grooves 17 and receive adequate support from the bottom wall of the groove. The form of construction illustrated in Figs. 7 and 8 is peculiarly adapted to receive oval pans of substantially the type illustrated in Fig. 5.

In Fig. 9 the fuel containing pan 20 is permanently connected with an arm or lever 24, the pan having a projecting ear 22 on each side, pivoted at 23 to the clamping arm or lever 24, a clamping set screw being employed as indicated at 25. In this construction the pivotal connection 23 allows the pan to readily adjust itself for equal bearing at all points upon the spacing member, whereas in the construction shown in Fig. 1 equal bearing is secured not only by reason of the fact that the fuel containing pan is a separate member, but also on account of the loose swivel connection between the spider and the screw which allows a slight tilting adjustment of the spider.

An extremely important feature of my invention, from the standpoint of economy in the use of material, is to be found in the fact that the fuel containing pan bears upon the spacing member at all points, i. e., it has a continuous circular bearing upon the upturned margin of the spacing member. This enables me to use extremely light thin material in constructing the spacer, since with a continuous bearing there will be sufficient strength to resist any ordinary clamping pressure. This enables me to construct vulcanizing packages composed of a spacer and a patch, having the patch applied in position for use without incurring an expense materially greater than that of supplying the patches alone. It greatly facilitates the repair work to provide spacers having patches applied thereto in position for use.

While I have referred to a solid fuel composed of card board, impregnated with combustible, it will, of course, be understood that I may use any absorbent material saturated with combustible fluid, or any other fuel in the form of a solid or in powder form, it being possible to employ liquid fuel where the pans or containers are made imperforate.

I claim:

1. A vulcanizer, including the combination of a fuel containing pan, and a separate metallic patch receiving spacer, adapted to receive the bottom of the pan and to form therewith a dead air space below the fuel pan.

2. A vulcanizer, including the combination of a fuel containing pan, and a separate patch receiving spacer, adapted when the pan is applied thereto to form a dead air space interposed between the pan and the patch.

3. A vulcanizer, including the combination of a fuel receiving pan, a separate spacing pan adapted to receive the fuel pan in superposed relation and provided with a concave patch receiving bottom.

4. A vulcanizer, including the combination of a fuel receiving pan, a separate spacing pan provided with a concave patch receiving bottom, said spacing pan having upturned margins adapted for continuous bearing upon the bottom of the fuel containing pan, on all sides of the spacer.

5. A vulcanizer, including the combination of a fuel containing pan, a patch receiving spacer adapted to be engaged by the pan, a clamping spider adapted to fit over the margins of the fuel containing pan, and having down turned and inturned portions.

6. A vulcanizer, including the combination of a fuel containing pan, a separate spacing member having a bottom surface adapted to bear upon the patch, and a clamping spider provided with means for covering the marginal portions of the fuel in the pan, and adapted to exert a clamping pressure upon the pan.

7. A vulcanizing member, comprising the combination of a spacing pan having an open shallow recess throughout the area of its upper surface, and a patch on the opposite side thereof, and a fuel containing pan adapted to serve as a cover therefor.

8. A vulcanizing member, comprising a spacer having an open shallow recess on one side, and a patch on the opposite side thereof, in combination with a fuel containing pan adapted to bear upon the margins of the spacer, and to coöperate therewith in forming a dead air space between the fuel containing pan and the patch.

9. In a vulcanizer, the combination of a fuel containing pan, a spider with which said pan is adapted to slidingly interlock, and a pan receiving spacer upon the margin of which the pan is adapted to bear when in position for use.

In testimony whereof I affix my signature in the presence of two witnesses.

MAXIMILLIAN P. JANISCH.

Witnesses:
O. C. WEBER,
LEVERETT C. WHEELER.